United States Patent
Riabov et al.

(10) Patent No.: US 11,107,182 B2
(45) Date of Patent: *Aug. 31, 2021

(54) TRANSLATION OF ARTIFICIAL INTELLIGENCE REPRESENTATIONS

(71) Applicant: International Business Machines Corporation, Armonk, NY (US)

(72) Inventors: Anton V. Riabov, Ann Arbor, MI (US); Shirin Sohrabi Araghi, Port Chester, NY (US); Octavian Udrea, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,146

(22) Filed: Dec. 17, 2019

(65) Prior Publication Data

US 2020/0160483 A1  May 21, 2020

Related U.S. Application Data

(63) Continuation of application No. 16/296,364, filed on Mar. 8, 2019, now Pat. No. 10,559,058, and a
(Continued)

(51) Int. Cl.
  *G06T 1/20* (2006.01)
  *G06N 5/02* (2006.01)
  (Continued)

(52) U.S. Cl.
  CPC ............. *G06T 1/20* (2013.01); *G06F 16/532* (2019.01); *G06N 5/02* (2013.01); *G06N 5/022* (2013.01); *G06N 20/00* (2019.01)

(58) Field of Classification Search
  CPC ..... G06T 1/20; G06F 15/18; G06F 17/30277; G06N 5/02
  See application file for complete search history.

(56) References Cited

U.S. PATENT DOCUMENTS 6,012,152 A   1/2000  Douik et al.
7,006,992 B1  2/2006  Packwood
(Continued)

FOREIGN PATENT DOCUMENTS

WO   2012/142092 A1   10/2012
WO   2013/119648 A1   8/2013

OTHER PUBLICATIONS

Yang et al. "Proceedings of the Fifteenth International Conference on Automated Planning and Scheduling," pp. 241-250. Monterey, CA, USA, Jun. 2005. AAAI Press. (Year: 2005).*
(Continued)

*Primary Examiner* — Tapas Mazumder
(74) *Attorney, Agent, or Firm* — Amin, Turocy & Watson, LLP

(57) ABSTRACT

Techniques for translating graphical representations of domain knowledge are provided. In one example, a computer-implemented method comprises receiving, by a device operatively coupled to a processor, a graphical representation of domain knowledge. The graphical representation comprises information indicative of a central concept and at least one chain of events associated with the central concept. The computer-implemented method further comprises translating, by the device, the graphical representation into an artificial intelligence planning problem. The artificial intelligence planning problem is expressed in an artificial intelligence description language. The translating comprises parsing the graphical representation into groupings of terms. A first grouping of terms of the grouping of terms comprises an event from the at least one chain of events and a second
(Continued)

grouping of terms of the grouping of terms comprises the information indicative of the central concept. The computer-implemented method also comprises validating, by the device, the artificial intelligence planning problem.

18 Claims, 8 Drawing Sheets

Related U.S. Application Data continuation of application No. 16/295,731, filed on Mar. 7, 2019, now Pat. No. 10,572,968, which is a continuation of application No. 15/842,252, filed on Dec. 14, 2017, now Pat. No. 10,242,425, said application No. 16/296,364 is a continuation of application No. 15/418,418, filed on Jan. 27, 2017, now Pat. No. 10,235,734.

(51) Int. Cl.
    *G06N 20/00*      (2019.01)
    *G06F 16/532*     (2019.01)

(56) References Cited

U.S. PATENT DOCUMENTS

| | | | |
|---|---|---|---|
| 7,146,348 | B2 | 12/2006 | Geib et al. |
| 8,082,220 | B2 | 12/2011 | Hadad et al. |
| 8,250,355 | B2 | 8/2012 | Eilam et al. |
| 9,177,060 | B1 | 11/2015 | Bennett et al. |
| 9,330,119 | B2 | 5/2016 | Chan et al. |
| 2003/0050814 | A1 | 3/2003 | Stoneking et al. |
| 2003/0139902 | A1 | 7/2003 | Geib et al. |
| 2007/0129834 | A1 | 6/2007 | Howard et al. |
| 2007/0150427 | A1 | 6/2007 | Geib |
| 2007/0271263 | A1 | 11/2007 | Merrild |
| 2008/0243570 | A1 | 10/2008 | Moorkanat et al. |
| 2010/0169360 | A1 | 7/2010 | Cohen et al. |
| 2011/0225002 | A1* | 9/2011 | Fackler .................. G06Q 50/22 705/2 |
| 2012/0265724 | A1 | 10/2012 | Michelin |
| 2012/0323627 | A1 | 12/2012 | Herring, Jr. et al. |
| 2013/0041712 | A1 | 2/2013 | Smoot et al. |
| 2013/0117060 | A1 | 5/2013 | Henriksen |
| 2013/0144917 | A1* | 6/2013 | Hosurmath ............ G06Q 10/06 707/803 |
| 2013/0185119 | A1 | 7/2013 | Palao et al. |
| 2014/0052494 | A1 | 2/2014 | Anne |
| 2015/0339580 | A1 | 11/2015 | Riabov et al. |
| 2015/0370766 | A1 | 12/2015 | Kossmann et al. |
| 2016/0321544 | A1 | 11/2016 | Hassanzadeh et al. |
| 2017/0056764 | A1 | 3/2017 | Shukla |
| 2017/0076194 | A1 | 3/2017 | Versace et al. |
| 2017/0213131 | A1 | 7/2017 | Hammond et al. |
| 2019/0114549 | A1 | 4/2019 | Ollsher |

OTHER PUBLICATIONS

Sohrabi et al., "Scenario Planning for Enterprise Risk Management", 5 pages.
Sohrabi et al., "Multi-Agent Plan Recognition with Noisy Observations and Temporal Actions", 5 pages.
Iranmanesh et al., "An Intelligent System Framework for Generating Activity List of a Project Using WBS Mind map and Semantic Network", International Journal of Computer, Electrical, Automation, Control and Information Engineering, World Academy of Science, Engineering and Technology, vol. 2, No. 4, 2008, pp. 1020-1027.
Jilani et al., "ASCoL: A Tool for Improving Automatic Planning Domain Model Acquisition", Springer International Publishing Switzerland, AIIA, Sep. 2015, pp. 438-451.
Behnke et al., "Integrating Ontologies and Planning for Cognitive Systems", Proceedings of the 28th International Workshop on Description Logics, 2015, 13 pages.
Sohrabi et al., "State Projection via AI Planning", Association for the Advancement of Artificial Intelligence, 2017, 7 pages.
Sohrabi et al., "Hypothesis Exploration for Malware Detection using Planning", Proceedings of the Twenty-Seventh AAAI Conference on Artificial Intelligence, Association for the Advancement of Artificial Intelligence, 2013, pp. 883-889.
Riabov et al., "Planning-Based Reasoning for Automated Large-Scale Data Analysis", Proceedings of the Twenty-Fifth International Conference on Automated Planning and Scheduling, Association for the Advancement of Artificial Intelligence, 2015, pp. 282-290.
Riabov et al., "New Algorithms for the Top-K Planning Problem", Proceeding of SPARK, ICAPS 2014, pp. 10-18.
Sohrabi et al., "Finding Diverse High-Quality Plans for Hypothesis Generation", 22nd European Conference on Artificial Intelligence, 2016, 2 pages.
Riabov et al., "Efficient High Quality Plan Exploration for Network Security", Proceedings of the Scheduling and Planning Applications workshop (SPARK), 2016, 6 pages.
Sohrabi et al., "Plan Recognition as Planning Revisited", Proceedings of the 25th International Joint Conference on Artificial Intelligence (IJCAI), 2016, 7 pages.
Wilkins, David E., "Can AI planners solve practical problems?", Computational Intelligence Journal, May 21, 1990, 32 pages.
Tate et al., "O-plan2: an Open Architecture for command, Planning and Control", Intelligent Scheduling, 1994, pp. 1-26.
Vaquero et al., "itSIMPLE 2.0: An Integrated Tool for Designing Planning Domains", AIPS, 2007, pp. 336-343.
Simpson et al., "Planning domain definition using GIPO", The Knowledge Engineering Review, vol. 22, No. 2, Cambridge University Press, 2007, pp. 117-134.
Yang et al., "Learning action models from plan examples using weighted MAX-SAT", Artificial Intelligence, vol. 171, 2006, pp. 107-143.
Yoon et al., "Towards Model-lite Planning: A Proposal for Learning & Planning with Incomplete Domain Models", workshop on AI Planning and Learning, 2007, 18 pages.
Zhuo et al., "Refining Incomplete Planning Domain Models Through Plan Traces", Proceedings of the Twenty-Third International Joint Conference on Artificial Intelligence (IJCAI), 2013, 7 pages.
Sohrabi et al., "Diagnosis as Planning Revisited", Proceedings of the Twelfth International Conference on the Principles of Knowledge Representation and Reasoning, 2010, pp. 26-36.
Sohrabi et al., "Preferred Explanations: Theory and Generation via Planning", Proceedings of the Twenty-Fifth AAAI Conference on Artificial Intelligence, 2011, pp. 261-267.
Haslum et al., "Diagnosis as Planning: Two Case Studies", International Scheduling and Planning Applications workshop (SPARK), 2011, 8 pages.
Ramírez et al., "Plan Recognition as Planning", Proceedings of the 21st International Joint Conference on Artificial Intelligence (IJCAI), 2009, pp. 1778-1783.
U.S. Appl. No. 14/962,714, filed Dec. 8, 2015, and entitled, "Plan Recognition With Unreliable Observations", 124 pages.
Schoemaker, Paul J.H., "Scenario Planning: A Tool for Strategic Thinking", Sloan Management Review, vol. 36, No. 2, 1995, pp. 25-40.
"Risk management—Principles and guidelines on implementation", ISO/DIS 3100, International Organization for Standardization, 2009, 28 pages.
Shvo et al., "An AI Planning-Based Approach to the Multi-Agent Plan Recognition Problem (Preliminary Report)", 2017, 9 pages.
"Multi-Criteria Approach to Planning and Scheduling through Criticism and Repair", ip.comTechnical Disclosure, Dec. 19, 2013, 7 pages.
"IBM Quality Program", ip.com Technical Disclosure, Apr. 11, 2007, 3 pages.
Kaminka et al., "Monitoring Teams by Overhearing: A Multi-Agent Plan-Recognition Approach", Journal of Artificial Intelligence Research. vol. 17, Aug. 2002, pp. 83-135.

(56) References Cited

OTHER PUBLICATIONS

Banerjee et al., "Multi-Agent Plan Recognition: Formalization and Algorithms", Proceedings of the Twenty-Fourth AAAI Conference on Artificial Intelligence, 2010, pp. 1059-1064.
Wikipedia, "Mind map", URL: https://en.wikipedia.org/wiki/Mind_map, 2017, 5 pages.
Non-Final Office Action received for U.S. Appl. No. 15/418,418 dated Apr. 4, 2018, 40 pages.
Non-Final Office Action received for U.S. Appl. No. 15/842,252 dated Apr. 5, 2018, 25 pages.
Final Office Action received for U.S. Appl. No. 15/418,418, dated Aug. 3, 2018, 34 pages.
Final Office Action received for U.S. Appl. No. 15/842,252, dated Aug. 3, 2018, 39 pages.
List of IBM Patents and Applications Treated as Related.
Non-Final Office Action received for U.S. Appl. No. 14/962,714 dated Aug. 8, 2018, 44 pages.
Final Office Action received for U.S. Appl. No. 14/962,714 dated Mar. 4, 2019, 17 pages.
Chen et al., "A planning approach to the recognition of multiple goals", International Journal of Intelligent Systems vol. 28, No. 3, 2013, pp. 203-216.
Brenner et al., "Continual Planning and Acting in dynamic Multiagent Environments", Autonomous Agents and Multi-Agent Systems, vol. 19, No. 3, 2009, 12 pages.
Fraser et al., "Plan Execution in Dynamic Environments." In International Conference on Industrial, Engineering and Other Applications of Applied Intelligent Systems, Springer, Berlin, Heidelberg, 2005, 10 pages.
Boutilier et al., "Planning Under Uncertainty: Structural Assumptions and Computational Leverage", Proceedings of the Second European Workshop on Planning, 1995, 16 pages.
Sampath et al., "Diagnosability of Discrete-Event Systems", IEEE Transactions on Automatic Control, vol. 40, No. 9, Sep. 1995, pp. 1555-1575.
Cordier et al., "Event-Based Diagnosis for Evolutive Systems", Fifth International Workshop on Principles of Diagnosis, Oct. 17-19, 1994, 24 pages.
Thorsley et al., "Diagnosability of Stochastic Discrete-Event Systems Under Unreliable Observations", American Control Conference, Jun. 11-13, 2008, pp. 1158-1165.
Grastien et al., "Exhaustive Diagnosis of Discrete Event Systems through Exploration of the Hypothesis Space", Twenty-Second International Workshop on Principles of Diagnosis, Oct. 4-7, 2011, 8 pages.
Grastien et al., "Diagnosis of Discrete-Event Systems Using Satisfiability Algorithms", Proceedings of the National Conference on Artificial Intelligence, vol. 22, No. 1, Jul. 22-26, 2007, 6 pages.
McIlraith, Sheila A., "Towards a Theory of Diagnosis, Testing and Repair", Proceedings of the Fifth International Workshop on Principles of Diagnosis, Oct. 17-19, 1994, 8 pages.
Ramirez et al., "Probabilistic Plan Recognition Using Off-the-Shelf Classical Planners", Proceedings of the Twenty-Fourth AAAI Conference on Artificial Intelligence, Jul. 11-15, 2010, 6 pages.
Non-Final Office Action received for U.S. Appl. No. 15/418,452 dated Jun. 2, 2020, 18 pages.
Brailean et al, Noise Reduction Filters for Dynamic Image Sequences: A Review, 1995, IEEE (Year: 1995).
Non-Final Office Action received for U.S. Appl. No. 15/418,452 dated Dec. 31, 2019, 53 pages.
Pommerening et al., "Optimal Planning for Delete-Free Tasks with Incremental LM-Cut", Proceedings of the Twenty-Second International Conference on Automated Planning and Scheduling, Jun. 25-29, 2012, pp. 363-367.

Nguyen et al.",Generating diverse plans to handle unknown and partially known user preferences", Artificial Intelligence, Jun. 18, 2012, pp. 1-31.
Srivastava et al., "Domain Independent Approaches for Finding Diverse Plans", International Joint Conference on Artificial Intelligence, Jan. 2007, 7 pages.
Bryce, Daniel., "Landmark-Based Plan Distance Measures for Diverse Planning", Proceedings of the Twenty-Fourth International Conference on Automated Planning and Scheduling, Jun. 21-26, 2014, pp. 56-64.
Coman et al., "Generating Diverse Plans Using Quantitative and Qualitative Plan Distance Metrics", Proceedings of the Twenty-Fifth AAAI Conference on Artificial Intelligence, Aug. 7-11, 2011, pp. 946-951.
Eppstein, David., "Finding the k Shortest Paths", Department of Information and Computer Science, University of California, Irvine, Mar. 31, 1997, pp. 1-26.
Gerevini et al., "Planning through Stochastic Local Search and Temporal Action Graphs in LPG", Journal of Artificial Intelligence Research, vol. 20, Dec. 2003, pp. 239-290.
Roberts et al., "Evaluating Diversity in Classical Planning", Proceedings of the Twenty-Fourth International Conference on Planning and Scheduling, Jun. 21-26, 2014, pp. 253-261.
Aslam et al., "The Star Clustering Algorithm for Information Organization", Grouping Multidimensional Data, Springer-Verlag, 2006, pp. 1-24.
Xu et al., "Survey of Clustering Algorithms", IEEE Transactions on Neural Networks, vol. 16, No. 3, May 2005, pp. 645-678.
Filippone et al., "A Survey of Kernel and Spectral Methods for Clustering", Pattern Recognition, vol. 41, No. 1, May 29, 2007, 37 pages.
Non-Final Office Action received for U.S. Appl. No. 16/295,731 dated Apr. 4, 2019, 47 pages.
Non-Final Office Action received for U.S. Appl. No. 15/418,377 dated Apr. 3, 2019, 54 pages.
Non-Final Office Action received for U.S. Appl. No. 16/296,364 dated May 1, 2019, 29 pages.
List of IBM Patents or Applications treated as related.
Non-Final Office Action received for U.S. Appl. No. 15/842,281 dated Jul. 29, 2019, 53 pages.
Final Office Action received for U.S. Appl. No. 15/418,377 dated Oct. 18, 2019, 54 pages.
Final Office Action received for U.S. Appl. No. 15/842,281 dated Dec. 11, 2019, 38 pages.
Final Office Action received for U.S. Appl. No. 15/418,452 dated Feb. 14, 2020, 17 pages.
Non-Final Office Action received for U.S. Appl. No. 15/418,377 dated Apr. 3, 2020, 30 pages.
Non-Final Office Action received for U.S. Appl. No. 15/842,281 dated Apr. 15, 2020, 30 pages.
Final Office Action received for U.S. Appl. No. 15/418,377 dated Jul. 9, 2020, 29 pages.
Final Office Action received for U.S. Appl. No. 15/842,281 dated Jul. 9, 2020, 29 pages.
Notice of Allowance received for U.S. Appl. No. 15/418,377 dated Jan. 27, 2021, 29 pages.
"Damerow, F., & Eggert, J. (2014). Predictive risk maps. 17th International IEEE Conference on Intelligent TransportationSystems (ITSC). doi: 10.1109/itsc.2014.6957772 (Year: 2014)".
Notice of Allowance received for U.S. Appl. No. 15/842,281 dated Feb. 5, 2021, 29 pages.
Final Office Action received for U.S. Appl. No. 15/842,449 dated Feb. 2, 2021, 18 pages.
Non-Final Office Action received for U.S. Appl. No. 15/842,449 dated Jun. 11, 2021, 23 pages.

* cited by examiner

TRANSLATION OF ARTIFICIAL INTELLIGENCE REPRESENTATIONS

STATEMENT REGARDING FEDERALLY SPONSORED RESEARCH OR DEVELOPMENT

This invention was made with Government support under Contract No.: H98230-13-D-0054/0006 awarded by Department of Defense. The Government has certain rights in this invention.

BACKGROUND

The subject disclosure relates to artificial intelligence representations, and more specifically, to translation of a graphical representation of domain knowledge associated with an artificial intelligence planning problem.

Automated planning and scheduling is a branch of artificial intelligence (AI) that concerns the realization of strategies or action sequences, typically for execution by intelligent agents, autonomous robots, and unmanned vehicles. Unlike classical control and classification problems, solutions are complex and must be discovered and optimized in multidimensional space. Planning is also related to decision theory. Planning may be performed such that solutions may be found and evaluated prior to execution; however, any derived solution often needs to be revised. Solutions usually resort to iterative trial and error processes commonly seen in artificial intelligence. These include dynamic programming, reinforcement learning, and combinatorial optimization.

A planning problem generally comprises the following main elements: a finite set of facts, the initial state (a set of facts that are true initially), a finite set of action operators (with precondition and effects), and a goal condition. An action operator maps a state into another state. In the classical planning, the objective is to find a sequence of action operators (or planning action) that, when applied to the initial state, will produce a state that satisfies the goal condition. This sequence of action operators is called a plan.

Plan recognition is the problem of recognizing the plans and the goals of an agent given a set of observations. There exist a number of different approaches to the plan recognition problem including the use of SAT solvers and planning where the domain theory is given as an input as well as the use of techniques that assume a plan library is given as an input. Plan recognition continues to be an important problem to study as it has many practical applications such as assisted cognition, computer games, and network monitoring.

For example, as described in Gregor Behnke et al., "Integrating Ontologies and Planning for Cognitive Systems" (Proc. Of the 28$^{th}$ Int. Workshop on Description Logics (2015)), "patterns and mechanisms that suitably link planning domains and interrelated knowledge in an ontology" are described. In Gregor Behnke et al., "an approach for using an ontology as the central source of domain knowledge for a cognitive system" is described. However, Gregor Behnke et al. does not present solutions to encoding domain knowledge that do not require specialized knowledge of the ontology.

As another example, as described in Rabia Jilani, "ASCoL: A Tool for Improving Automatic Planning Domain Model Acquisition" (Advances in Artificial Intelligence, 2015), "AI planning requires domain models." Rabia Jilani introduces "ASCoL, a tool that exploits graph analysis for automatically identifying static relations, in order to enhance planning domain models." However, Rabia Jilani does not address receipt of dynamic information, or lack of plan traces in the received information. Furthermore, Rabia Jilani does not present solutions to encoding domain knowledge that do not require specialized knowledge of the plan traces.

Furthermore, many other conventional approaches to plan recognition also require specialized knowledge of artificial intelligence description languages in order to be useful. It may be relatively difficult for a person having specialized domain knowledge, but lacking specialized artificial intelligence training, to fully utilize artificial intelligence planning. Furthermore, a lack of accurately encoded domain knowledge in the artificial intelligence description language can prohibit the use of artificial intelligence planning for plan recognition problems in general.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate machine learning to provide incremental static program analysis.

Mind maps are examples of diagrams or graphical representations that represent domain knowledge. Mind maps can represent domain concepts, and relationships to other concepts, in a simple form. While it is often challenging to encode this domain knowledge in a planning language or artificial intelligence description language, it can be easier to express the domain knowledge graphically in mind maps. For example, and according to one or more embodiments of this disclosure, a domain expert having little or no knowledge of a particular artificial intelligence description language can still accurately express domain knowledge in a graphical representation. Furthermore, according to one or more embodiments of this disclosure, the graphical representation can be automatically translated into any particular artificial intelligence description language. Accordingly, one or more embodiments of this disclosure provide artificial intelligence planning solutions where domain experts are not required to have specialized artificial intelligence training.

According to an embodiment, a computer-implemented method is provided. The computer-implemented method can comprise receiving, by a device operatively coupled to a processor, a graphical representation of domain knowledge. The graphical representation can comprise information indicative of a central concept and at least one chain of events associated with the central concept. The computer-implemented method can further comprise translating, by the device, the graphical representation into an artificial intelligence planning problem. The artificial intelligence planning problem can be expressed in an artificial intelligence description language. The translating can comprise parsing the graphical representation into groupings of terms. A first grouping of terms of the grouping of terms can comprise an event from the at least one chain of events and a second grouping of terms of the grouping of terms can comprise the information indicative of the central concept. The translating can also comprise identifying an initial state of the domain knowledge based on the first grouping of terms and the second grouping of terms. The computer-implemented method can also comprise validating, by the device, the artificial intelligence planning problem. According to this example, benefits are realized in that a graphical representation of domain knowledge is automatically encoded into the artificial intelligence description language. Further benefits include the validating to ensure the artificial intelligence planning problem is a valid artificial intelligence planning problem.

According to another embodiment, the computer-implemented method can comprise identifying one or more constants based on the first grouping of terms, identifying one or more predicates and one or more actions based on the one or more constants, and encoding the initial state, the one or more constants, the one or more predicates, and the one or more actions into the artificial intelligence description language. Therefore, according to this example, several aspects of specialized knowledge in artificial intelligence planning are handled in novel manner. For example, constants, predicates, and actions can be automatically encoded through the facilitation of the described example.

According to another embodiment, the graphical representation can comprise one or more weights associated with an event of the at least one chain of events, where the translating can further comprise associating the one or more weights with the one or more predicates and the one or more actions. Therefore, according to this example, relatively complex graphical representations comprising additional features, such as weighted edges, can also be automatically encode in the artificial intelligence description language. Accordingly, while a domain expert may have specialized domain knowledge related to the weights and weighted edges, no specialized artificial intelligence planning knowledge is required.

According to another embodiment, domain knowledge of the graphical representation of domain knowledge can be changed, and the computer-implemented method can further comprise propagating the changed graphical representation of domain knowledge. Therefore, according to this example, on-the-fly changes to domain knowledge can be handled without requiring specialized knowledge of the artificial intelligence description language.

According to another embodiment, the computer-implemented method can also comprise receiving, by the electronic device, a second graphical representation, and updating, by the electronic device, the initial state of the domain knowledge based on the second graphical representation. Therefore, according to this example, multiple new graphical representations of domain knowledge can be processed. Accordingly, new domain knowledge, current domain knowledge, or otherwise altered domain knowledge can be taken into consideration without a domain expert having any specialized artificial intelligence training.

According to yet another embodiment, the validating of the computer-implemented method can comprise determining, by the device, through an artificial intelligence planning component an artificial intelligence plan as a solution to the artificial intelligence planning problem, and determining, by the device, that the artificial intelligence plan include a valid pathway of the graphical representation of the artificial intelligence planning problem. Therefore, according to this example, the computer-implemented method can ensure the artificial intelligence planning problem is a valid artificial intelligence planning problem as related to the graphical representation provided by the domain expert.

In some embodiments, elements described in connection with the computer-implemented can be embodied in different forms such as one or more program instructions stored on a computer readable storage medium, a computer program product, a system, or another form.

DETAILED DESCRIPTION

Figure 1:
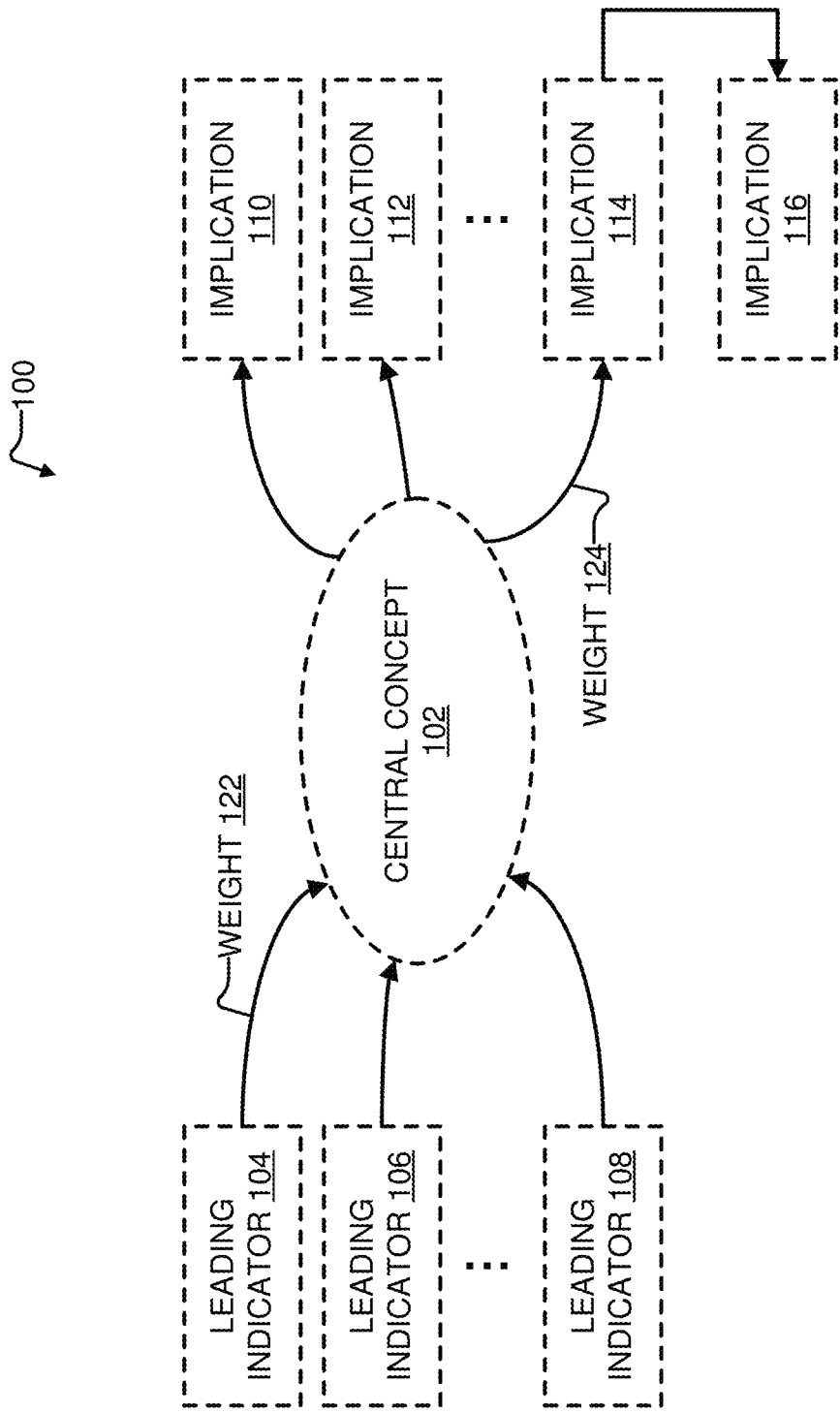
FIG. 1 illustrates a diagram of an example, non-limiting graphical representation of domain knowledge associated with an artificial intelligence planning problem in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

This disclosure relates in some embodiments to artificial intelligence representations, and more specifically, to translation of a graphical representation of domain knowledge associated with an artificial intelligence planning problem.

Mind maps are examples of diagrams or graphical representations that can represent domain knowledge. These graphical representations can represent domain concepts, and relationships to other concepts, in a simple form. While it is often challenging to encode this domain knowledge in a planning language or artificial intelligence description language, it can be easier to express the domain knowledge graphically in a diagram. For example, and according to one or more embodiments of this disclosure, a domain expert having little or no knowledge of a particular artificial intelligence description language can still accurately express domain knowledge in a graphical representation. Furthermore, according to one or more embodiments of this disclosure, the graphical representation can be automatically translated into any particular artificial intelligence description language. Accordingly, embodiments of this disclosure provide artificial intelligence planning solutions where domain experts are not required to have specialized artificial intelligence training.

In this disclosure, several computer-implemented methods are described that facilitate extraction of artificial intelligence planning knowledge from graphical representations in an automated manner. This facilitates the use of artificial intelligence planning for many applications including plan recognition, diagnosis, and explanation generation. Accordingly, in situations where observations need to be explained given domain knowledge, one or more embodiments of this disclosure provide for automatically extracting this domain knowledge without having the domain knowledge formally represented and encoded in an artificial intelligence description language.

According to one or more embodiments, computer-implemented methods are provided that can receive one or more graphical representations that represent the domain knowledge, and that can automatically translate the graphical representations into an artificial intelligence planning problem. The generated artificial intelligence planning problem can be then transmitted to an artificial intelligence planning component to generate one or more plans. The graphical representations can be received from any suitable source, and can be presented in any suitable manner.

Several benefits of some embodiments of this disclosure can include capture of the concepts and relationships provided graphically in a simple and easy to use approach. This disclosure can also facilitate more effective and efficient execution of artificial intelligence planning via automation from concepts described in graphical representations to an end result of an accurate artificial intelligence planning problem. It follows then, that further benefits of some embodiments of this disclosure can include validation of the artificial intelligence planning problem and generation of solutions to the artificial intelligence planning problem.

According to one or more embodiments disclosed herein, the translation of graphical representations of domain knowledge into an artificial intelligence description language is presented using a novel approach. According to at least one embodiment, a validation technique is also described for validation of outputs. To this end, a multi-step translation technique is described in detail that facilitates the use of artificial intelligence planning for the computation of the posterior probabilities of the possible goals, thereby validating the translation.

Turning now to the drawings, FIG. 1 illustrates a diagram of an example, non-limiting graphical representation of domain knowledge 100 associated with an artificial intelligence planning problem in accordance with one or more embodiments of the disclosed subject matter. The graphical representation of domain knowledge 100 can comprise a central concept 102, leading indicator 104, leading indicator 106, leading indicator 108, implication 110, implication 112, and implication 114. The graphical representation of domain knowledge 100 can further comprise implication 116 associated with implication 116, weight 122 associated with leading indicator 104, and weight 124 associated with implication 114.

It should be understood that the particular arrangement of the graphical representation of domain knowledge 100 can change according to associated domain knowledge. For example, more or fewer leading indicators, weights, and/or implications can be included according to any particular implementation and associated domain knowledge. Additionally, more or fewer weights associated with any number of leading indicators and/or implications can also be applicable. Accordingly, the particular form of the graphical representation of domain knowledge 100 should not be considered limiting in any manner.

As shown in FIG. 1, the central concept 102 is a general concept representative of a desirable occurrence or force in an associated domain. For example, a possible force can include a "low oil price". Other possible forces can also be applicable to particular domains. Accordingly, exhaustive description of a plurality of different forces and central concepts is omitted herein for the sake of brevity.

As further shown in FIG. 1, there are several arrows providing for directionality to and from the central concept 102. From the arrows, several traits of the domain knowledge can be inferred. For example, arrows directed towards the central concept 102 can be indicative of a source concept being a "leading indicator". Furthermore, arrows directed from the central concept 102 can be indicative of a possible "implication". Moreover, several concepts can be tied together to establish a chain of events leading to or from the central concept in any desirable manner Thus, the particular arrangement of arrows illustrated in FIG. 1 are merely examples of one possible graphical representation of a particular domain knowledge, and therefore should not be construed as limiting.

As further shown in FIG. 1, the central concept 102 can be associated with leading indicator 104, leading indicator 106, and leading indicator 108. The leading indicators can represent a portion of the domain knowledge of the graphical representation of domain knowledge 100. The leading indicators can comprise concepts that can affect the central concept 102. For example, and without limitation, continuing the example of a central concept of a "low oil price," a possible leading indicator can include a "warmer than normal winter in the northern hemisphere." Thus, if this leading indicator were true, a resulting implication may result that affects the central concept.

As further shown in FIG. 1, the central concept 102 may be associated with implication 110, implication 112, and implication 114. Additionally, implication 116 can be associated with implication 116. The implications may represent a portion of the domain knowledge of the graphical representation of domain knowledge 100. The implications can include concepts or implications affected by the leading indicators and any possible occurrence. For example, and without limitation, continuing the example of a central concept of a "low oil price," a possible implication can include "oil prices continue to rise." Thus, if the example leading indicator of a "warmer than normal winter in the northern hemisphere" were true, the possible implication of "oil prices continue to rise" may also be true as an implication of the leading indicator and central concept. Furthermore, as illustrated in FIG. 1, under some circumstances, implication 116 may result as a link in a chain of events beginning with a particular leading indicator being true, that particular leading indicator causing implication 114, and implication 114 therefore causing implication 116. Other chains of events can also be applicable under some circumstances.

As further shown in FIG. 1, leading indicator 104 can include a weight 122 associated the leading indicator 104. Additionally, the implication 114 can include a weight 124 associated with the implication 114. Generally, the weight 122 and the weight 124 can represent an action cost or other similar attribute. The action cost can indicate a cost of performing an action associated with the leading indicator 104 and/or the implication 114. Furthermore, although not illustrated for clarity, according to at least one embodiment, every leading indicator can include an associated weight or cost. Additionally, according to at least one embodiment, every implication can include an associated weight or cost. Similarly, according to some embodiments, at least one or more leading indicators does not have an associated weight or cost. Moreover, according to some embodiments, at least one or more implications does not have an associated weight or cost. Thus, the particular arrangement of the graphical representation of domain knowledge 100 can be varied in many ways.

According to one or more embodiments, the graphical representation of domain knowledge 100 can be parsed and translated into an artificial intelligence planning problem as an initial output. The artificial intelligence planning problem can be expressed in an artificial intelligence description language. For example, and without limitation, an artificial intelligence description language can include a form of Planning Domain Description Language. However, it is to be understood than any suitable artificial intelligence description language can be applicable. Upon translation into the artificial intelligence planning problem, one or more embodiments can also include validating the artificial intelligence planning problem to create a validated artificial intelligence planning problem as an additional output. Either of the artificial intelligence planning problem and the validated artificial intelligence planning problem can be beneficial in tuning operation of different translation components that are described more fully below.

Figure 2:
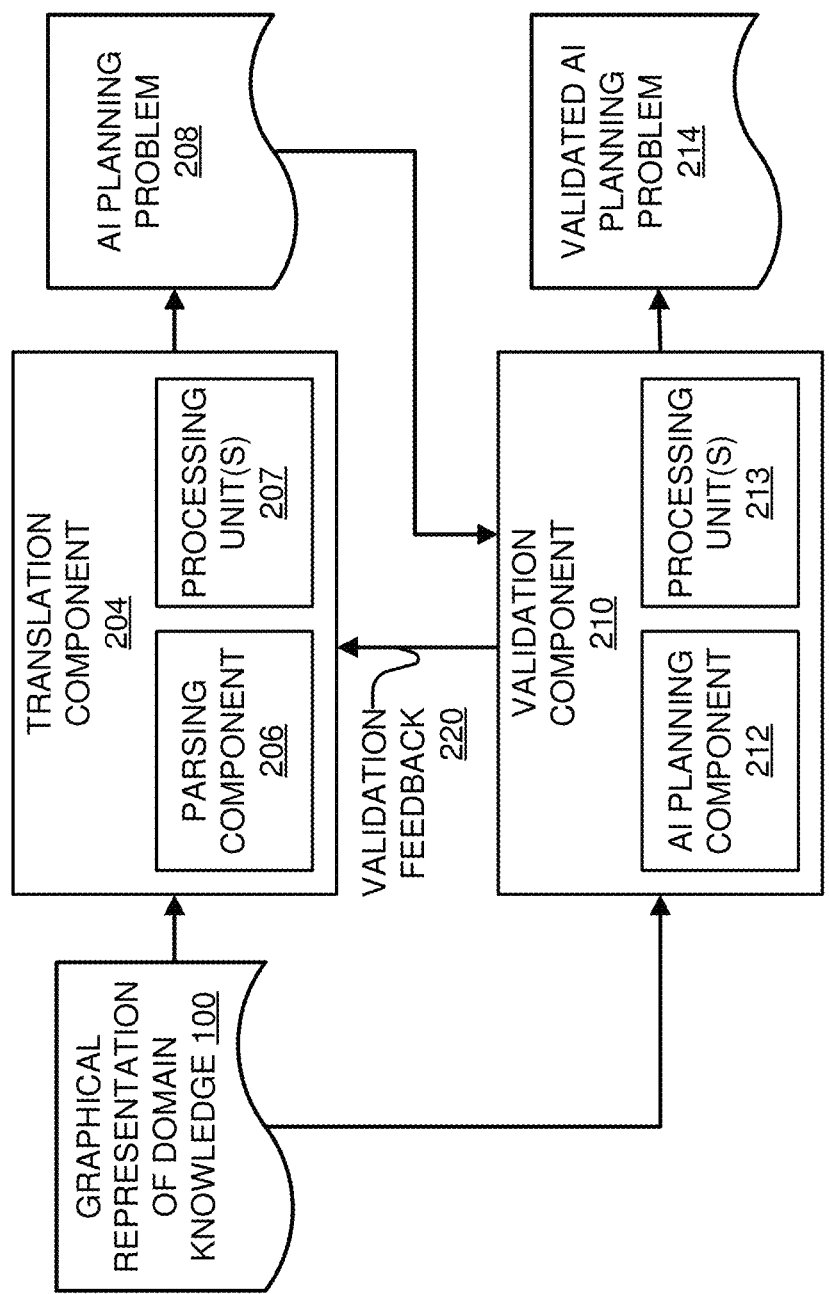
FIG. 2 illustrates a block diagram of an example, non-limiting system that can translate graphical representations of domain knowledge associated with an artificial intelligence planning problem in accordance with one or more embodiments of the disclosed subject matter.

FIG. 2 illustrates a block diagram of an example, non-limiting system 200 that can translate graphical representations of domain knowledge associated with an artificial intelligence planning problem in accordance with one or more embodiments of the disclosed subject matter. The system 200 can include a translation component 204 and a validation component 210 electrically coupled to the translation component 204. Furthermore, the translation component can include a parsing component 206 and one or more processing units 207 arranged therein. Additionally, the validation component 210 can include an artificial intelligence planning component 212 and one or more processing units 213 arranged therein. Other arrangements of the individual illustrated components of the system 200 can also be applicable. Therefore, the particular arrangement illustrated is one non-limiting example. Repetitive description of like elements employed in other embodiments described herein is omitted for sake of brevity.

As shown in FIG. 2, the translation component 204 can receive input via an electronic input device and can output an artificial intelligence plan via an electronic output device. Accordingly, the translation component 204 can perform one or more functions of the system 200. Furthermore, the validation component 210 can receive input via an electronic input device and can output a validated artificial intelligence plan via an electronic output device. Accordingly, the validation component 210 can perform one or more functions of the system 200.

The translation component 204, including the parsing component 206, is an artificial intelligence component that can be arranged to perform a computer-implemented method. Accordingly, the translation component 204 can include defined hardware (e.g., the one or more processing units 207) configured to automate several program instructions described herein. The translation component 204 can also be implemented as a discrete set of program instructions that implement any portion of the described methodologies in any ordered sequence. Furthermore, although illustrated as a distinct component, the parsing component 206 can also be integrated within the translation component 204. As illustrated, the translation component 204 can receive as input the graphical representation of domain knowledge 100 for processing.

Responsive to receiving the graphical representation of domain knowledge 100, the translation component 204 can translate the graphical representation of domain knowledge 100 into an artificial intelligence planning problem 208. The translation of the translation component 204 can be facilitated using a translation algorithm, which is described more fully below. The translation component 204 can process and translate the graphical representation of domain knowledge 100, and can output the artificial intelligence planning problem 208.

Figure 7:
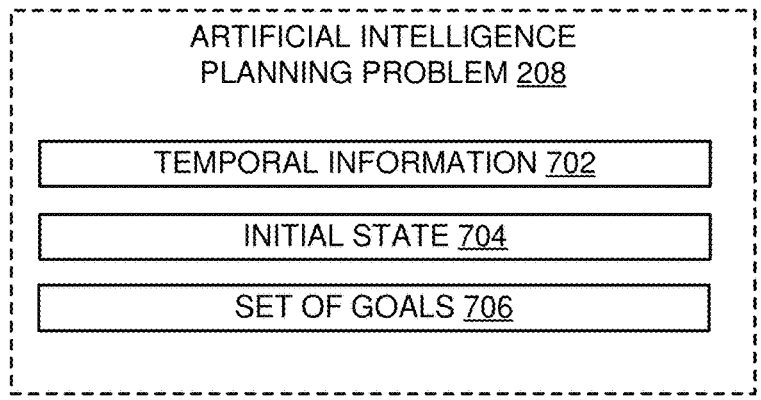
FIG. 7 illustrates a block diagram of a non-limiting example of an artificial intelligence planning problem in accordance with certain embodiments of the disclosed subject matter.

The artificial intelligence planning problem 208 can include a plurality of data and information relating to the graphical representation of domain knowledge 100. For example, and as illustrated in FIG. 7, the artificial intelligence planning problem 208 can include temporal information 702, an initial state 704, and a set of goals 706. Repetitive description of like elements employed in other embodiments described herein is omitted for sake of brevity.

Generally, an artificial intelligence planning problem can be represented based on Definition 1 and the plan recognition can be based on Definition 2, shown below.

Definition 1: A planning problem with action costs is a tuple P=(F, A, I, G), where F is a finite set of fluent symbols, A is a set of actions with preconditions, Pre(a), add effects, Add(a), delete effects, Del(a), and non-negative action costs, Cost(a), I⊆F defines the initial state, and G⊆F defines the goal state.

A state, s, is a set of fluents with known truth value. An action a is executable in a state s if Pre(a)⊆s. The successor state is defined as $\delta(a; s)=((s \setminus Del(a)) \cup Add(a))$ for the executable actions. The sequence of actions $\pi=[a_1, \ldots, a_n]$ is executable in s if the state $s'=\delta(a_n, \delta(a_{n-1}, \ldots, \delta(a_1, s)))$ is defined. Moreover, π is the solution to the planning problem P if it is executable from the initial state and $G \subseteq \delta(a_n, \delta(a_{n-1}, \ldots, \delta(a_1, I)))$. Furthermore, π is said to be optimal if it has minimal cost, or there exists no other plan that has a better cost than this plan. A planning problem P may have more than one optimal plan. Also note that the tuple (F, A, I) is often referred to as the planning domain.

As relayed in Definition 1, the term "fluents" can refer to fluent conditions and/or other conditions that change over time. Fluent conditions can be conditions that change over time, and can include a variety of conditions associated with the domain knowledge represented by the graphical representation of domain knowledge 100. These fluent conditions can include, for example, degradation of an object, traffic within a loading dock, weather conditions over a defined geography, and other suitable conditions. Other fluent conditions and/or conditions that change over time are also contemplated, and the examples provided herein are not to be construed as limiting in any manner.

Furthermore, an artificial intelligence plan recognition problem for processing by an artificial intelligence planning component can be represented as set forth in Definition 2, below.

Definition 2: An artificial intelligence plan recognition problem is a tuple PR=(F, A, I, O, Γ, PROB), where (F, A, I) is the planning domain as defined in Definition I above, O= $[o_1, \ldots, o_m]$, where $o_i \in F$, $i \in [1, m]$ is the sequence of observations, Γ is the set of possible goals G, G⊆F, and PROB is the goal priors, P (G).

Unreliable, unexplainable, or otherwise noisy observations are defined as those that have not been added to the state as a result of an effect of any of the actions in a plan for a particular goal, while missing observations are those that are added to the state but are not observed (i.e., are not part of the observation sequence). To address the noisy observations, the definition of satisfaction of an observation sequence by an action sequence is modified to allow for observations to be left unexplained. Given an execution trace and an action sequence, an observation sequence is said to be satisfied by an action sequence and its execution trace if there is a non-decreasing function that maps the observation indices into the state indices as either explained or discarded.

Turning back to FIG. 2, the validation component 210, including the artificial intelligence planning component 212, is an artificial intelligence validation component that can be arranged to perform a computer-implemented method. Accordingly, the validation component 210 can include defined hardware (e.g., the one or more processing units 213) configured to automate several program instructions described herein. The validation component 210 can also be implemented as a discrete set of program instructions that implement the described methodologies in any ordered sequence. Furthermore, although illustrated as a distinct component, the artificial intelligence planning component 212 can also be integrated within the validation component 210. As illustrated, the validation component 210 can receive as input the graphical representation of domain knowledge 100 and the artificial intelligence planning problem 208 for processing.

Responsive to receiving the graphical representation of domain knowledge 100 and the artificial intelligence planning problem 208, the validation component 210 can validate the artificial intelligence planning problem 208. The validation of the validation component 210 can be facilitated using a validation algorithm, which is described more fully below. Generally, validation can include, for example, determining a solution to the artificial intelligence planning problem 208 via the artificial intelligence planning component 212. Upon determining the solution, the validation component 210 can determine if a valid path, according to the determined solution, exists within the graphical representation of domain knowledge 100. Such a valid path validates the solution, and therefore validates the artificial intelligence planning problem 208. Accordingly, the validation component 210 can process the graphical representation of domain knowledge 100 and the artificial intelligence planning problem 208, and can output a validated artificial intelligence planning problem 214.

Figure 8:
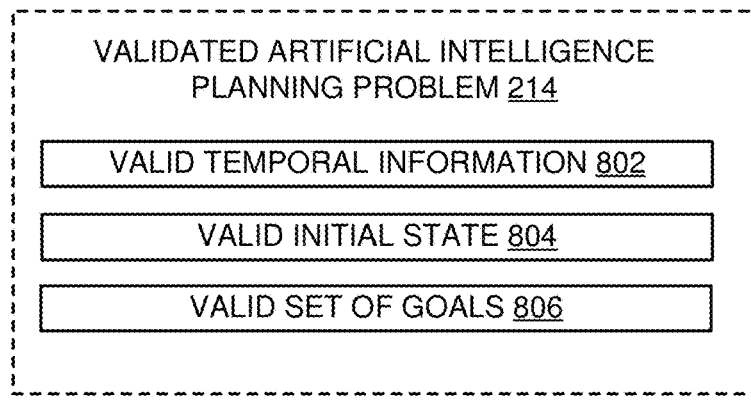
FIG. 8 illustrates a block diagram of a non-limiting example of a validated artificial intelligence planning problem in accordance with certain embodiments of the disclosed subject matter.

The validated artificial intelligence planning problem 214 can comprise a plurality of valid data and valid information relating to the graphical representation of domain knowledge 100. For example, and as illustrated in FIG. 8, the validated artificial intelligence planning problem 214 can comprise valid temporal information 802, a valid initial state 804, and a valid set of goals 806. Repetitive description of like elements employed in other embodiments described herein is omitted for sake of brevity.

Figure 9:
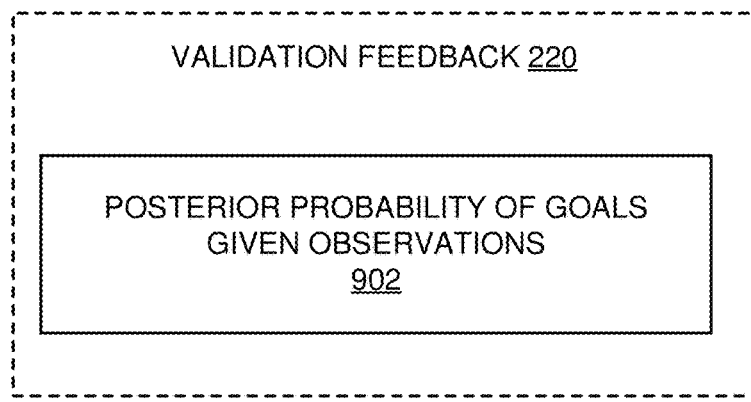
FIG. 9 illustrates a block diagram of a non-limiting example of a solution of a problem model in accordance with certain embodiments of the disclosed subject matter.

Responsive to validating the artificial intelligence planning problem 208, the validation component 210 can provide validation feedback 220 to the translation component 204. For example, as illustrated in FIG. 9, validation feedback 220 can include the validated solution of the artificial intelligence planning problem and/or a feedback as to the artificial intelligence planning problem 208 being invalid. A validated solution can include a posterior probability of goals given observations 902. Repetitive description of like elements employed in other embodiments described herein is omitted for sake of brevity.

The solution to the artificial intelligence planning recognition problem can comprise the posterior probabilities, the probability of a plan given the observations, P (π|O), and/or the probability of a goal given the observations, P (G|O). P (π|O) can be approximated by normalizing three objectives over a set of sample plans: (i) cost of the original actions, (ii) number of missing observations, and (iii) number of noisy observations. P (G|O) can be computed by a summation over P (π|O) for all plans that achieve G and satisfy O. The sampled set of plans can be computed using either diverse planning or top-k planning on the transformed planning problem. Additionally, the sampled set of plans can be computed using other artificial intelligence planning solutions. Accordingly, the artificial intelligence planning problem projects a future state of the domain knowledge.

As described above, the system 200 can include a translation component 204 configured to translated the graphical representation of domain knowledge 100 and output an artificial intelligence planning problem 208. Furthermore, the validation component 210 can be configured to validate the artificial intelligence planning problem 208 and output a validated artificial intelligence planning problem 214. Hereinafter, a more detailed discussion of one or more embodiments comprising computer-implemented methods for facilitating translating of the graphical representation of domain knowledge 100 is provided.

Figure 3:
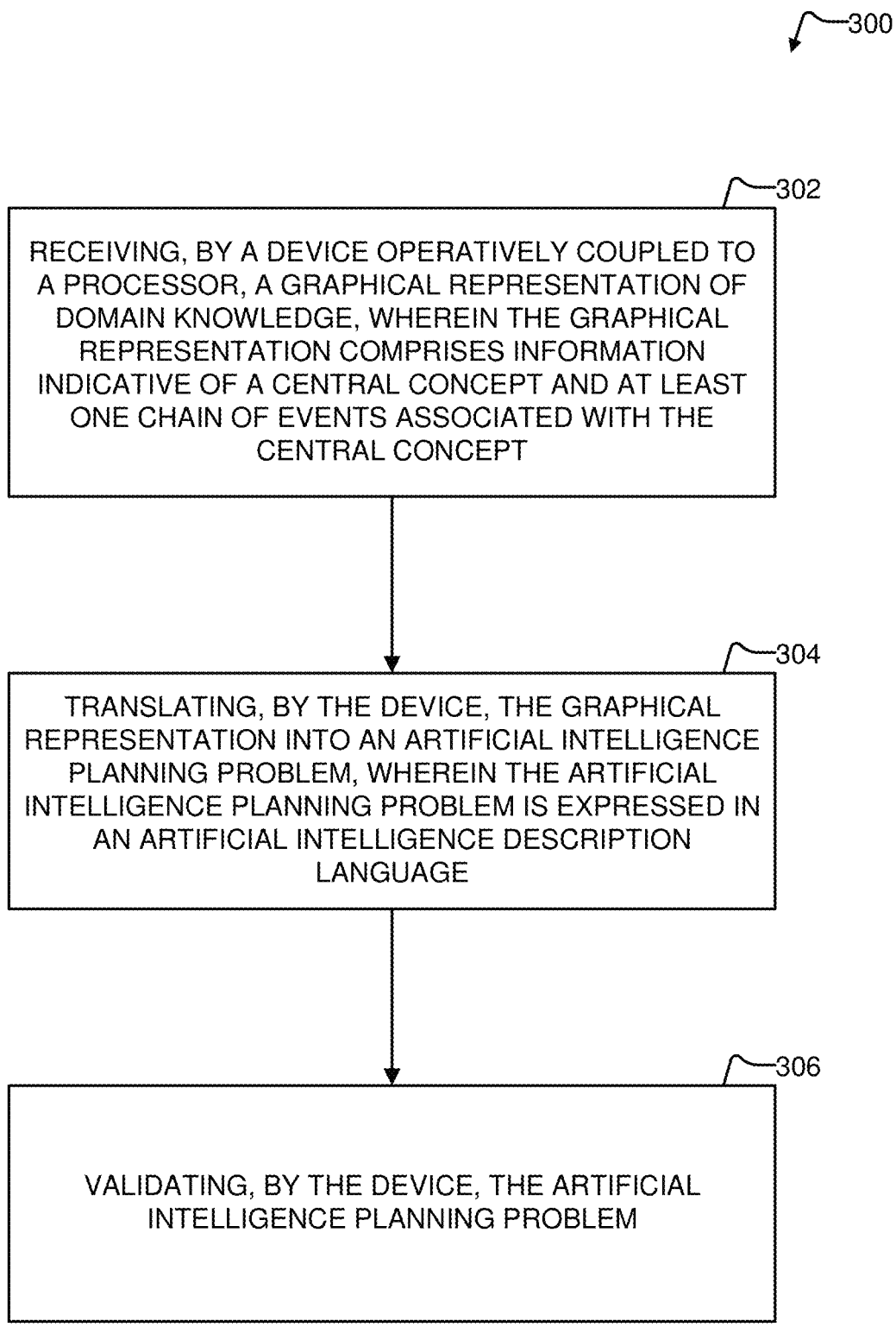
FIG. 3 illustrates a flowchart of an example, non-limiting computer-implemented method of translating graphical representations of domain knowledge associated with an artificial intelligence planning problem in accordance with one or more embodiments of the disclosed subject matter.

FIG. 3 illustrates a flowchart of an example, non-limiting computer-implemented method 300 of translating graphical representations of domain knowledge associated with an artificial intelligence planning problem in accordance with one or more embodiments of the disclosed subject matter.

The computer-implemented method 300 can include, for example, a sequence of program instructions to be performed by a translation component, such as the translation component 204. The computer-implemented method 300 can include, but is not limited to, block 302, block 304, and block 306. Repetitive description of like elements employed in other embodiments described herein is omitted for the sake of brevity.

The computer-implemented method 300 can comprise receiving, by a device operatively coupled to a processor, a graphical representation of domain knowledge, at block 302 (e.g., by translation component 204). The graphical representation of domain knowledge can be received from an electronic input device.

According to at least one embodiment, the graphical representation can comprise information indicative of a central concept and at least one chain of events associated with the central concept. Generally, the information indicative of a central concept can be encoded into the graphical representation as a centralized concept with one or more arrows flowing to and/or from the central concept.

The computer-implemented method 300 can also comprise translating, by the device, the graphical representation into an artificial intelligence planning problem, at block 304 (e.g., by translation component 204). The artificial intelligence planning problem can be expressed in an artificial intelligence description language. As a non-limiting example, the artificial intelligence description language can include a planning domain description language (PDDL), a planning domain definition language, an artificial intelligence planning language, or any other suitable artificial intelligence language. Suitable artificial intelligence description languages may include languages where encoding of domain information is supported.

Generally, the translating of block 304 can include additional functional features for parsing and assembling the graphical representation into the artificial intelligence planning problem. For example, further details regarding at least one embodiment for parsing and assembling the graphical representation into the artificial intelligence planning problem are described more fully below. Accordingly, when processed by the translation component 204, the translation of the graphical representation of domain knowledge 100 into the artificial intelligence planning problem 208 cannot be performed by a human (e.g., is greater than the capability of a single human mind). For example, an amount of data processed, a speed of processing of data and/or data types processed by the translation component over a certain period of time can be greater, faster and different than an amount, speed and data type that can be processed by a single human mind over the same period of time.

Responsive to block 304, the computer-implemented method 300 can also comprise validating, by the device, the artificial intelligence planning problem, at block 306 (e.g., by validation component 210). Generally, the validating can be facilitated by a validation algorithm facilitated by the artificial intelligence planning component 212. Other forms of validation may also be applicable, and are described more fully below. Accordingly, when processed by the validation component 210, the generation of a solution to the artificial intelligence planning problem 208 to create a validated artificial intelligence planning problem 214 (e.g., is greater than the capability of a single human mind). For example, an amount of data processed, a speed of processing of data and/or data types processed by the validation component over a certain period of time can be greater, faster and different than an amount, speed and data type that can be processed by a single human mind over the same period of time.

Responsive to the validating, the validation component 210 can output a validated artificial intelligence planning problem as described in detail above.

As described with reference to FIG. 3, a computer-implemented method of translating a graphical representation of domain knowledge into an artificial intelligence planning problem can comprise translating through use of a translation algorithm. Details related to one embodiment of a translation algorithm are presented with reference to FIG. 4.

Figure 4:
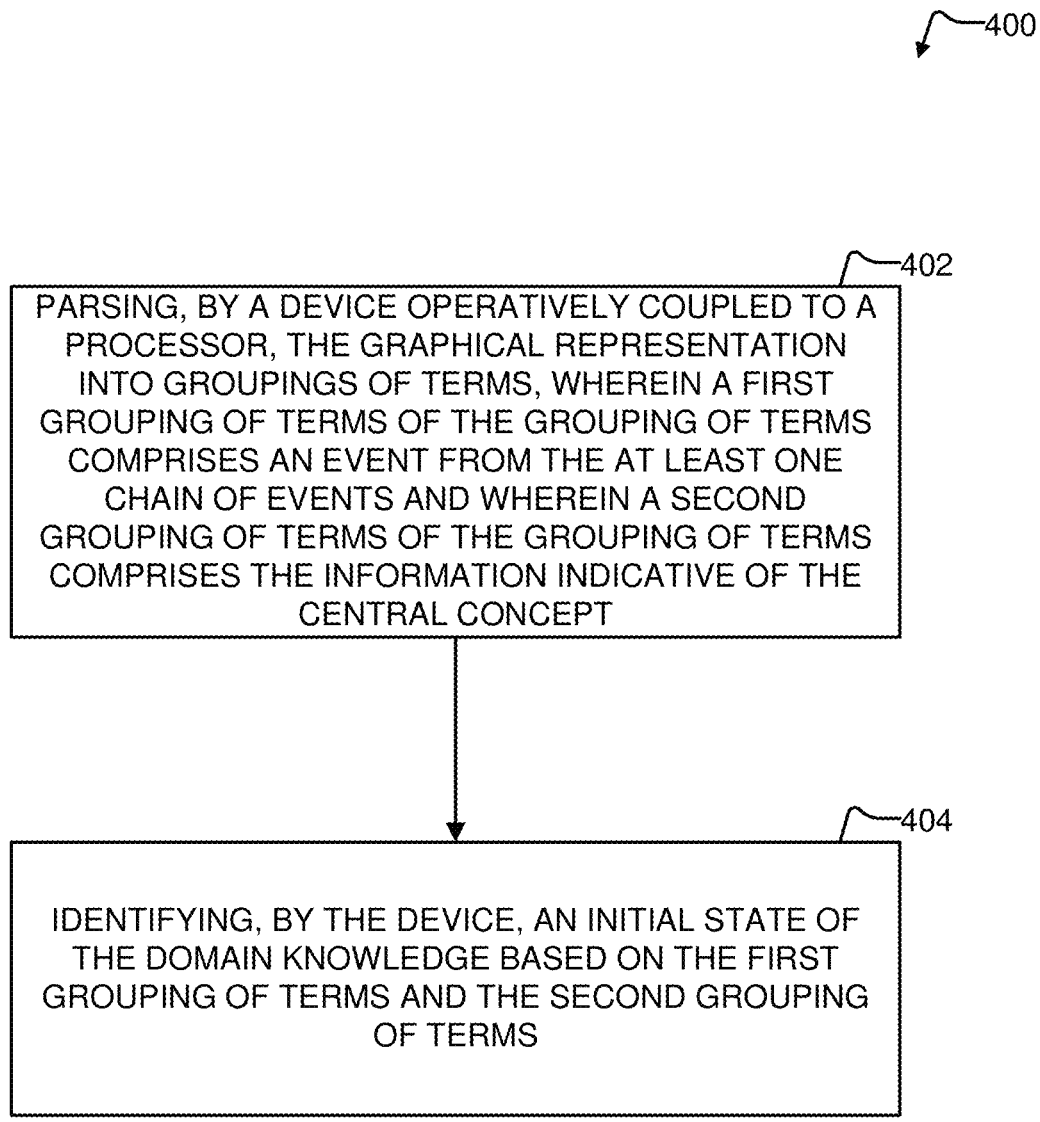
FIG. 4 illustrates a flowchart of an example, non-limiting computer-implemented method of translating graphical representations of domain knowledge associated with an artificial intelligence planning problem in accordance with one or more embodiments of the disclosed subject matter.

FIG. 4 illustrates a flowchart of an example, non-limiting computer-implemented method 400 of translating graphical representations of domain knowledge associated with an artificial intelligence planning problem in accordance with one or more embodiments of the disclosed subject matter.

The computer-implemented method 400 can comprise, for example, a sequence of program instructions to be performed by a parsing component and/or a translation component, such as the parsing component 206 and the translation component 204. The computer-implemented method 400 can include, but is not limited to, block 402 and block 404. Repetitive description of like elements employed in other embodiments described herein is omitted for sake of brevity.

Figure 6:
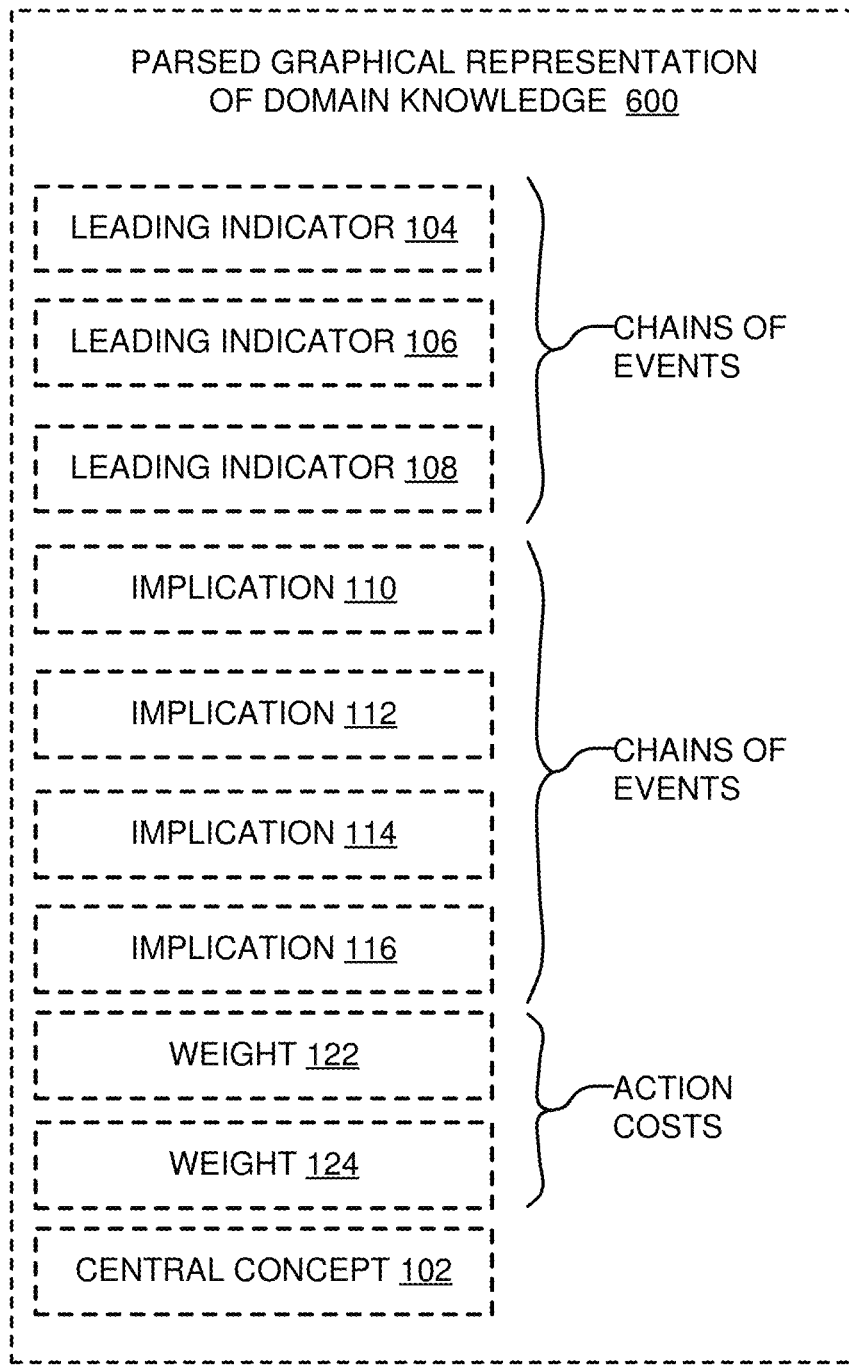
FIG. 6 illustrates a block diagram of a non-limiting example of a parsed graphical representation of domain knowledge associated with an artificial intelligence planning problem in accordance with certain embodiments of the disclosed subject matter.

The computer-implemented method 400 can comprise, for example, parsing the graphical representation into groupings of terms, at block 402 (e.g., by parsing component 206). According to block 402, a first grouping of terms of the grouping of terms can comprises an event from the at least one chain of events. Furthermore, a second grouping of terms of the grouping of terms can comprise the information indicative of the central concept. For example, as illustrated in FIG. 6, the parsed graphical representation of domain knowledge can be organized into the groupings of terms. The groupings of terms can include one or more chains of events associated with leading indicators, one or more chains of events associated with implications, one or more action costs and/or weights, and information indicative of a central concept. Repetitive description of like elements employed in other embodiments described herein is omitted for sake of brevity.

According to at least one embodiment, the computer-implemented method 400 can also comprise identifying one or more constants based on the first grouping of terms (e.g., by the translation component 204). For example and without limitation, the one or more constants can comprise a set of constants indicating a set of occurrences and factors. The one or more constants can be parsed from the graphical representation of domain knowledge and organized according to rules or procedures for the artificial intelligence description language. One possible organization of example constants is presented below in Table 1.

TABLE 1

(:constants
more-profits-for-local-big-businesses
reduced-ability-to-invest-and-expand-operations
tighter-monetary-policy
volatility-in-the-price-of-oil
- occurrence
decreased-revenue
- bisimplication
currency-appreciation
social-stability
- factor It is noted that the examples presented in Table 1 are expressed in a particular form of artificial intelligence description language, a Planning Domain Description Language. Other forms of artificial intelligence description languages can also be applicable, and therefore the particular form of Table 1 should not be construed as limiting. It is further noted that particular example constants expressed in Table 1 are associated with a single example, and should not be construed as limiting.

According to at least one embodiment, the computer-implemented method 400 can also comprise identifying one or more predicates and one or more actions based on the one or more constants (e.g., by the translation component 204). For example, the one or more predicates can be based on any leading indicators identifiable in the graphical representation of domain knowledge. Furthermore, the one or more actions can be based on edges or arrows identifiable in the graphical representation of domain knowledge, as described in detail above. Therefore, in an embodiment comprising identifying one or more predicates and one or more actions, several aspects of specialized knowledge in artificial intelligence planning are handled in novel manner. For example, constants, predicates, and actions can be automatically encoded without requiring specialized knowledge of the artificial intelligence description language.

The one or more predicates can be organized according to rules or procedures for the artificial intelligence description language. One possible organization of example predicates is presented below in Table 2.

TABLE 2

```
(:predicates
    (__indicator ?y - factor ?x - occurrence)
    (__next ?x - occurrence ?x - occurrence)
    (__next-bis ?x - occurrence ?x — busimplication)
    (_fact ?x - occurrence)
    (occur ?x - occurrence)
)
```

It is noted that the examples presented in Table 2 are expressed in a particular form of artificial intelligence description language, a Planning Domain Description Language. Other forms of artificial intelligence description languages can also be applicable, and therefore the particular form of Table 2 should not be construed as limiting. Following the example of Table 2, and somewhat similarly, the one or more actions can be organized according to rule or procedures for the artificial intelligence description language. One possible organization of example actions is presented below in Table 3.

TABLE 3

```
(:action next-state-transition
    :parameters (?x1 - occurrence ?x2 - occurrence)
    :cost (10)
    :precondition (and (occur ?x1))
    :precondition (and (__next ?x1 ?x2))
    :effect (and
            (not (occur ?x1))
            (occur ?x2)
            (_fact ?x2)
    ))
(:action next-state-transition-bis-implication
    :parameters (?x1 - occurrence ?x2 - bisimplication)
    :cost (10)
    :precondition (and (occur ?x1))
    :precondition (and (__next-bis ?x1 ?x2))
    :effect (and
            (not (occur ?x1))
            (_bis_ ?x2)
    ))
(:action indicator-occurred
    :parameters (?y - factor ?x - occurrence)
    :cost (10)
    :precondition (and (__is-true ?y))
    :precondition (and (__ indicator ?y ?x))
    :effect (and (not (__is-true ?y))
            (occur ?x)
            (_fact ?x)
    ))
```

It is noted that the examples presented in Table 3 are expressed in a particular form of artificial intelligence description language, a Planning Domain Description Language. Other forms of artificial intelligence description languages can also be applicable, and therefore the particular form of Table 3 should not be construed as limiting. It is further noted that as presented with reference to Table 2 and Table 3, the indicator "occurred" could be modified to assign weights and/or costs to the different main concepts. The weights and/or costs can be similar to the weights and/or costs described in detail above. For example, the weights and/or costs can also comprise a level of importance as well as a particular value. According to one embodiment, the level of importance can include "low," "medium," and/or "high". Furthermore, each particular level of importance can be associated with a difference and/or unique cost representative of an edge weight. Other forms of weights and/or costs can also be applicable. Therefore, these particular examples should not be construed as limiting.

Accordingly, the graphical representation can further comprise one or more weights associated with an event of the at least one chain of events. Similarly, the graphical representation can also comprise one or more probabilities between an event of the at least one chain of events. The probabilities can be represented as a different form of a weight and/or cost. Thus, the computer-implemented method 400 can further comprise associating the one or more weights with the one or more predicates and the one or more actions as described above. Therefore, an in embodiment where the graphical representation comprises one or more weights, relatively complex graphical representations can also be automatically encoded in the artificial intelligence description language. Accordingly, while a domain expert may have specialized domain knowledge related to the weights and weighted edges, no specialized artificial intelligence planning knowledge is required.

According to at least one embodiment, the computer-implemented method 400 can also comprise encoding the initial state, the one or more constants, the one or more predicates, and the one or more actions into the artificial intelligence description language (e.g., by the translation component 204). For example, the encoding can comprise parsing and organizing each of the initial state, the one or more constants, the one or more predicates, and the one or more actions in a similar manner as outlined in Table 1, Table 2, and Table 3.

The computer-implemented method 400 can further comprise identifying the initial state of the domain knowledge based on the first grouping of terms and the second grouping of terms, at block 404 (e.g., by parsing component 206). Generally, the initial state can be identified through the graphical representation of domain knowledge by parsing and identifying any leading indicators or other factors pointing to an initial state of the domain knowledge. For example, one possible indication of an initial state can comprise identifying whether a particular graphical representation of domain knowledge can actually occur by establishing a special predicate. One special predicate can include a "_is-true" predicate as set forth below in Table 4.

TABLE 4

```
(:init
;; initial state
    (__is-true social-unrest)
    (__is-true social-stability)
)
```

It is noted that the examples presented in Table 4 are expressed in a particular form of artificial intelligence description language, a Planning Domain Description Language. Other forms of artificial intelligence description languages can also be applicable, and therefore the particular form of Table 4 should not be construed as limiting. Furthermore, other forms of initial state information can be identified through possible indicators and associated effects. Examples of possible indicators and associated effects are set forth below in Table 5.

TABLE 5

(_indicator volatility-in-the-price-of-oil a-warmer-than-normal-winter-in-the-northern-hemisphere )
(_indicator volatility-in-the-price-of-oil a-colder-than-normal-winter-in-the-normal-hemisphere )
(_indicator volatility-in-the-price-of-oil economic-decline )
(_indicator volatility-in-the-price-of-oil increased-demand-for-oil)

It is noted that the examples presented in Table 5 are expressed in a particular form of artificial intelligence description language, a Planning Domain Description Language. Other forms of artificial intelligence description languages can also be applicable, and therefore the particular form of Table 5 should not be construed as limiting.

Hence, several methodologies for identifying an initial state from a graphical representation have been described. As shown in Table 4 and Table 5, identification of the initial state can include, for each graphical representation of domain knowledge being processed, updating an initial state with the special predicate "_is-true" and a factor term. As further shown in Table 4 and Table 5, identification of the initial state can include, for each graphical representation of domain knowledge being processed, associating a leading indicator with possible indicators and associated effects such as an "_indicator" and factor term and occurrence term. Other methodologies for identifying and updating an initial state for an artificial intelligence planning problem can also be applicable. Therefore, these particular examples should not be construed as limiting.

In addition to the methodologies described above, it is noted that one or more new, different, or changed graphical representations of domain knowledge can be received by one or more components during processing. For example, real-world changes or changes to domain knowledge can be expressed in a new, second, or altered graphical representation of domain knowledge. Therefore, according to at least one embodiment, the computer-implemented method 400 can also include propagating the changed graphical representation of domain knowledge. Additionally, the computer-implemented method 400 can include receiving a second graphical representation and updating the initial state of the domain knowledge based on the second graphical representation. Therefore, in an embodiment where the graphical representation is changed, on-the-fly changes to domain knowledge can be handled without requiring specialized knowledge of the artificial intelligence description language.

Furthermore, the updating and/or propagating can include repeating, as desired, any of the above-described sequences of operations such that the changed graphical representation of domain knowledge is translated as described above. Thus, the computer-implemented method 400 can further comprise encoding changes to the initial state, changes to the one or more constants, changes to the one or more predicates, and changes to the one or more actions into the artificial intelligence description language. Therefore, in an embodiment where the graphical representation is changed, any changes to domain knowledge can be automatically propagated and encoded in the artificial intelligence description language without necessitating use of the artificial intelligence description language by an expert.

As described above, several translation algorithms can be applicable to embodiments, and can be performed by the translation component 204 and/or the parsing component 206. The translation algorithms can also support new, updated, or changed graphical representation of domain knowledge. Furthermore, the results of the translation algorithms, which have been described with reference to an artificial intelligence planning problem, can be validated according to a validation algorithm as described below.

Figure 5:
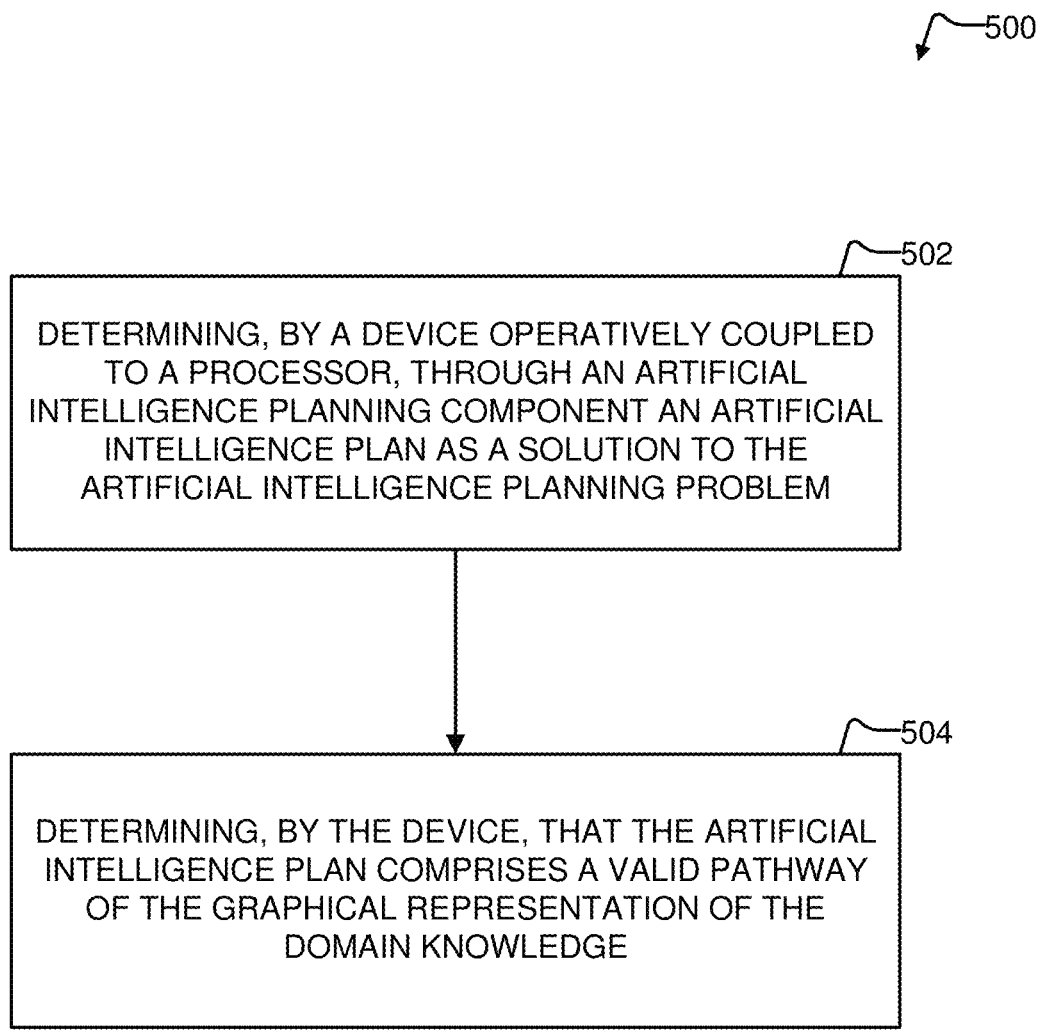
FIG. 5 illustrates a flowchart of an example, non-limiting computer-implemented method of translating graphical representations of domain knowledge associated with an artificial intelligence planning problem in accordance with one or more embodiments of the disclosed subject matter.

FIG. 5 illustrates a flowchart of an example, non-limiting computer-implemented method 500 of translating graphical representations of domain knowledge associated with an artificial intelligence planning problem in accordance with one or more embodiments of the disclosed subject matter.

The computer-implemented method 500 can comprise, for example, a sequence of program instructions to be performed by a validation component and/or an artificial intelligence planning component, such as the validation component 210 and the artificial intelligence planning component 212. The computer-implemented method 500 can include, but is not limited to, block 502 and block 504. Repetitive description of like elements employed in other embodiments described herein is omitted for sake of brevity.

The computer-implemented method 500 can comprise determining, by the device, through an artificial intelligence planning component an artificial intelligence plan as a solution to the artificial intelligence planning problem, at block 502 (e.g., by artificial intelligence planning component 212). As described in detail above with reference to Definition 1 and Definition 2, several different methodologies of determining a solution to the artificial intelligence planning problem can be applicable.

As further shown in FIG. 5, the computer-implemented method 500 can also comprise determining, by the device, that the artificial intelligence plan comprises a valid pathway of the graphical representation of the domain knowledge, at block 504 (e.g., by the validation component 210). As described in detail above, the determination of a pathway of the graphical representation of the domain knowledge can be facilitated through input of the graphical representation to the validation component 210. Responsive to receiving as input the graphical representation of the domain knowledge, the validation component 210 can be configured to determine if the solution is a valid solution. Therefore, in an embodiment comprising block 502 and/or block 504, the computer-implemented method 500 can ensure the artificial intelligence planning problem is a valid artificial intelligence planning problem as related to the graphical representation provided by the domain expert, without requiring specialized knowledge of the artificial intelligence description language.

As described above, translation of graphical representations of domain knowledge into an artificial intelligence planning problem has been provided through the various embodiments described herein. Embodiments described in this disclosure can include, for example, a computer-implemented method and a translation component that can provide the described solution. Embodiments described in this disclosure can also include, for example, a computer-implemented method and a validation component that can provide the described solution. The computer-implemented method can comprise receiving a graphical representation of domain knowledge and translating the graphical representation into an artificial intelligence planning problem expressed in an artificial intelligence description language.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
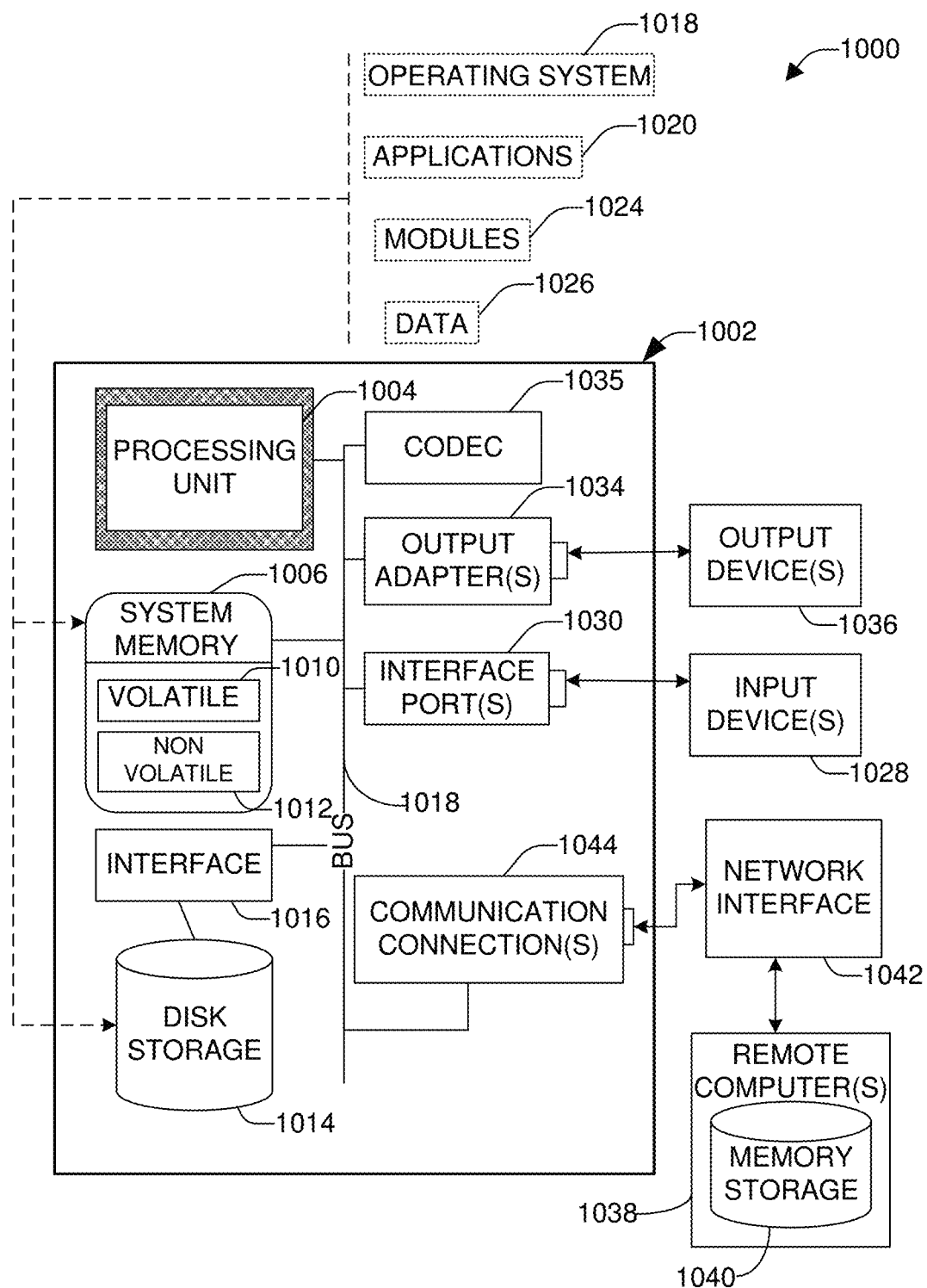
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    translating, by a device operatively coupled to a processor, into an artificial intelligence planning problem, a graphical representation comprising information indicative of a central concept, wherein the translating comprises associating one or more weights with one or more predicates and one or more actions, and wherein the translating further comprises:
    identifying one or more constants based on a grouping of terms indicative of the graphical representation.

2. The computer-implemented method of claim 1, wherein the translating further comprises:
    identifying the one or more predicates and the one or more actions based on one or more constants.

3. The computer-implemented method of claim 2, further comprising:
    encoding the one or more constants and the one or more actions into an artificial intelligence description language.

4. The computer-implemented method of claim 1, wherein the graphical representation further comprises the one or more weights associated with an event of at least one chain of events.

5. The computer-implemented method of claim 4, wherein the artificial intelligence planning problem comprises one or more observations from the graphical representation.

6. The computer-implemented method of claim 5, wherein the one or more observations are one or more unreliable observations.

7. The computer-implemented method of claim 1, wherein the artificial intelligence planning problem projects a future state of domain knowledge.

8. The computer-implemented method of claim 1, wherein an action of the one or more predicates is associated with an action cost that indicates a cost of performing the action.

9. The computer-implemented method of claim 1, wherein the one or more weights is associated with a value indicative of a level of importance.

10. A computer program product facilitating translating a graphical representation of domain knowledge, the computer program product comprising a computer readable storage medium having program instructions embodied therewith, the program instructions executable by a processing unit to cause the processing unit to:
    translate into an artificial intelligence planning problem, a graphical representation comprising information indicative of a central concept, wherein the translating comprises associating one or more weights with one or more predicates and one or more actions, and identification of one or more constants based on a grouping of terms indicative of the graphical representation.

11. The computer program product of claim 10, wherein the translation further comprises:
    identification of the one or more predicates and the one or more actions based on one or more constants.

12. The computer program product of claim 11, wherein the program instructions are further executable by the processing unit to cause the processing unit to:
    encode the one or more constants and the one or more actions into an artificial intelligence description language.

13. The computer program product of claim 10, wherein the graphical representation further comprises the one or more weights associated with an event of at least one chain of events.

14. The computer program product of claim 13, wherein the artificial intelligence planning problem comprises one or more observations from the graphical representation, and wherein the artificial intelligence planning problem projects a future state of domain knowledge.

15. The computer program product of claim 10, wherein an action of the one or more predicates is associated with an action cost that indicates a cost of performing the action.

16. The computer program product of claim 10, wherein the one or more weights is associated with a value indicative of a level of importance.

17. A system, comprising:
    a memory that stores computer executable components; and
    a processor that executes the computer executable components stored in the memory, wherein the computer executable components comprise:
    a translation component that:
    translates into an artificial intelligence planning problem, a graphical representation comprising information indicative of a central concept, wherein the translation comprises associating one or more weights with one or more predicates and one or more actions, and wherein the translation component also identifies one or more constants based on a grouping of terms indicative of the graphical representation.

18. The system of claim 17, wherein the translation component also identifies the one or more predicates and the one or more actions based on the one or more constants.

* * * * *